(12) United States Patent
Kondo et al.

(10) Patent No.: US 7,323,079 B2
(45) Date of Patent: Jan. 29, 2008

(54) PRODUCTION PROCESS OF CORE MATERIAL FOR VACUUM INSULATION MATERIAL

(75) Inventors: Daisuke Kondo, Tokyo (JP); Shinichi Ochiai, Tokyo (JP); Masato Hayashi, Asahi (JP); Hideto Sato, Asahi (JP)

(73) Assignee: Asahi Fiber Glass Co., Ltd., Tokyo (JP)

( * ) Notice: Subject to any disclaimer, the term of this patent is extended or adjusted under 35 U.S.C. 154(b) by 204 days.

(21) Appl. No.: 10/891,008

(22) Filed: Jul. 15, 2004

(65) Prior Publication Data

US 2005/0023731 A1 Feb. 3, 2005

(30) Foreign Application Priority Data

Jul. 28, 2003 (JP) ............................. 2003-202426
May 25, 2004 (JP) ............................. 2004-154554

(51) Int. Cl.
*B32B 37/00* (2006.01)

(52) U.S. Cl. .................. 156/307.1; 156/62.2; 156/181; 156/296

(58) Field of Classification Search ............... 156/62.2, 156/62.8, 181, 296, 307.1; 428/69
See application file for complete search history.

(56) References Cited

U.S. PATENT DOCUMENTS

| | | | | |
|---|---|---|---|---|
| 3,824,086 A | * | 7/1974 | Perry et al. .................... | 65/522 |
| 5,149,920 A | * | 9/1992 | Meeker et al. ............... | 181/290 |
| 5,591,505 A | * | 1/1997 | Rusek et al. ................... | 428/69 |
| 5,609,934 A | * | 3/1997 | Fay ............................. | 428/74 |

FOREIGN PATENT DOCUMENTS

| | | | |
|---|---|---|---|
| JP | 60-14695 | | 1/1985 |
| JP | 9-4785 | | 1/1997 |
| JP | 10115396 A | * | 5/1998 |
| JP | 2001-108186 | | 4/2001 |

OTHER PUBLICATIONS

Abstract for JP 10115396.*
Machine translation for JP 10115396.*

* cited by examiner

*Primary Examiner*—John L Goff
(74) *Attorney, Agent, or Firm*—Oblon, Spivak, McClelland, Maier & Neustadt, P.C.

(57) ABSTRACT

A core material for a vacuum insulation material is produced by forming under heat a mat of inorganic fibers with an uncured, thermosetting organic binder adhered thereon into the core material while pressing the mat for at least 30 seconds such that a density of the mat increases to 150 to 400 kg/m$^3$.

12 Claims, 2 Drawing Sheets

US 7,323,079 B2

PRODUCTION PROCESS OF CORE MATERIAL FOR VACUUM INSULATION MATERIAL

FIELD OF THE INVENTION

This invention relates to a production process of a core material for a vacuum insulation material. It is to be noted that the term "inorganic fiber mat" or "glass fiber mat" as used herein means an inorganic fiber mat or glass fiber mat to which the process of the present invention is applied and that the term "core material" means an inorganic fiber mat or glass fiber mat produced by the application of the process of the present invention.

DESCRIPTION OF THE BACKGROUND

As heat-insulating core materials for vacuum insulation materials, core materials each of which is composed of one or more inorganic fiber mats of a material having a high heat-insulating effect, such as glass wool or rock wool, have been widely adopted conventionally. JP-A-60-14695 (published: Jan. 25, 1985) and JP-A-2001-108186 (published: Apr. 20, 2001) disclose that an organic binder is applied to an inorganic fiber mat upon production of such a core material so that the filling of the resulting core material into an envelope would be facilitated upon production of a vacuum insulation material.

According to the processes disclosed in the above patent publications, a centrifugal process or flame attenuation process is generally used to form a molten inorganic material into fibers such that the fibers are caused to accumulate or are collected to provide a mat-shaped preform. After a binder is sprayed onto the mat-shaped preform, the mat-shaped preform is formed under pressure and heat into a core material for a vacuum insulation material.

In a mat-shaped preform obtained by the above-described centrifugal process or the like, however, fibers are oriented in a three-dimensionally entangled form because they are drawn as relatively long fibers and are caused to accumulate in bent forms. When the mat-shaped preform with a binder applied thereon is formed under pressure and heat into a core material, the core material is inserted into an envelope and the resulting vacuum insulation material is filled in a heat-insulating casing, the vacuum insulation material is accompanied by a problem that its heat insulating properties are poor because in the core material, the fibers are fixedly bonded together in the above-described form and are not oriented perpendicularly relative to a direction in which heat is conducted.

Moreover, the vacuum insulation material obtained by the above-described process involves another problem that its surfaces are not smooth. When the vacuum insulation material is filled in a heat-insulating casing, spacings are formed between the inner walls of the casing and the vacuum insulation material due to rugged surfaces of the vacuum insulation material, thereby developing a further problem that the vacuum insulation material is inferior in heat insulating properties. In JP-A-9-4785 (published: Jan. 7, 1997), on the other hand, a process is disclosed to have fibers, which make up a core material, oriented perpendicularly relative to a direction in which heat is conducted. According to this process, fibers of 1 mm or shorter lengths are dispersed in water and are then collected together into a mat-shaped form. This process is, however, accompanied by a problem that it requires time and labor.

SUMMARY OF THE INVENTION

With the foregoing problems of the conventional art in view, the present invention has as an object thereof the provision of a process which makes it possible to easily obtain a core material for a vacuum insulation material, said core material containing fibers oriented perpendicularly relative to a direction in which heat is conducted, and having smooth surfaces and excellent heat-insulating properties.

To achieve the above-described object, the present invention provides a production process of a core material for a vacuum insulation material, which comprises forming under heat a mat of inorganic fibers with an uncured, thermosetting organic binder adhered thereon into the core material while pressing the mat for at least 30 seconds such that a density of the mat increases to 150 to 400 kg/m$^3$.

In the above-described production process according to the present invention, it is preferred that an amount of solids in the uncured, thermosetting organic binder which is contained in the mat accounts for 0.5 to 3.0 wt. % of a total amount of the mat, said total amount including the amount of the solids in the thermosetting organic binder; that the mat is pressed for from 60 seconds to 180 seconds; that subsequent to an application of the uncured, thermosetting organic binder to inorganic fibers, the inorganic fibers are collected into a mat-shaped body, and the mat-shaped body is then formed into the core material under heat and pressure; that the inorganic fibers have an average diameter of from 3 to 5 μm, and before the forming under heat and pressure, the mat of inorganic fibers has a density of at least 3 kg/m$^3$ and a thickness of from 10 to 350 mm; that the forming is conducted under pressure and heat such that the resulting core material has a density of from 45 to 100 kg/m$^3$ and a thickness of from 10 to 70 mm; and that a plurality of stacked mats of inorganic fibers with the uncured, thermosetting organic binder adhered thereon are formed into a core material under heat while the plurality of stacked mats are pressed for at least 30 seconds such that a density of the stacked mats increases to 150 to 400 kg/m$^3$.

The core material for the vacuum insulation material, which have been obtained by the above-described production process of the present invention, contains fibers oriented perpendicularly to a direction in which heat is conducted, and has smooth surfaces and excellent heat-insulating properties. Use of the core material makes it possible to easily and efficiently obtain a vacuum insulation material excellent in heat insulation performance.

DETAILED DESCRIPTION OF THE PREFERRED EMBODIMENTS

Figure 1:
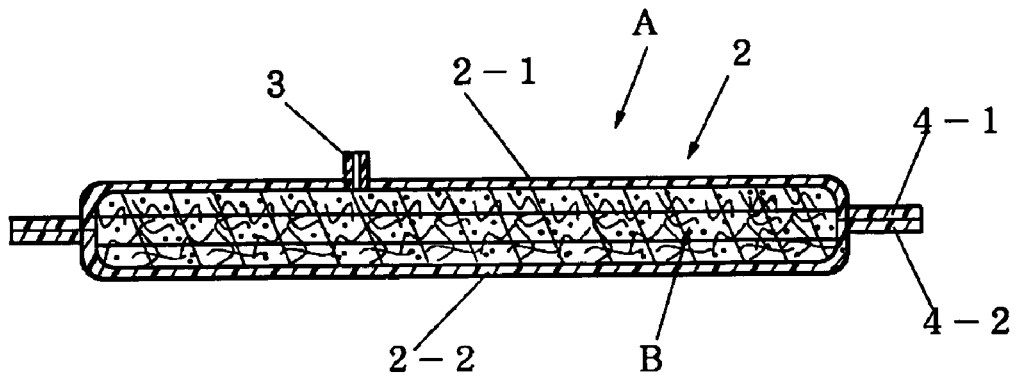
FIG. 1 is a schematic illustration of the structure of a conventionally-known vacuum insulation material.

With reference to the drawings illustrating the preferred embodiments, the present invention will next be described in further detail. FIG. 1 shows a conventionally-known vacuum insulation material A as a whole, a gas barrier envelope 2, an evacuation tube 3 for sealing the envelope 2, peripheral seal portions 4-1, 4-2, and a core material B composed of inorganic fiber mats and filled under vacuum in the envelope 2. In the illustrated vacuum insulation material A, the core material B composed of mats of inorganic fibers such as glass fibers is covered by the gas barrier envelope 2 made of aluminum-accumulated polyethylene films or the like, and the inside of the envelope 2 is maintained under vacuum (reduced pressure, for example, 1 to 10 Pa or so).

As the core material B composed of the inorganic fiber mats is simply covered with the envelope 2 in the vacuum insulation material A, the inorganic fibers in the core material do not all extend horizontally in the direction of the plane of the vacuum insulation material so that the vacuum insulation material is insufficient in heat insulating properties. For a similar reason, the envelope 2 is inferior in surface smoothness when incorporated in the vacuum insulation material. In various applications where heat insulating properties are required such as refrigerators and personal computers, the insertion of such a vacuum insulation material in a casing results in the formation of spacings on and along inner walls of the casing so that the vacuum insulation material also acts as a cause of poor heat-insulating properties. Further, the core material B composed of the bulky inorganic fiber mats is inferior in working efficiency upon its insertion into a bag consisting of the envelope 2 for the production of the vacuum insulation material A.

The present invention can solve the above-described problems. Upon production of a heat insulation material composed of inorganic fiber mat or mats such as that shown in FIG. 1, the use of the specific process according to the present invention provides a core material which, when incorporated in a vacuum insulation material, contains inorganic fibers aligned substantially horizontally with the direction of the plane of the vacuum insulation material while providing the vacuum insulation material with smooth surfaces. Moreover, the core material has good working efficiency upon production of the vacuum insulation material.

Figure 2A:
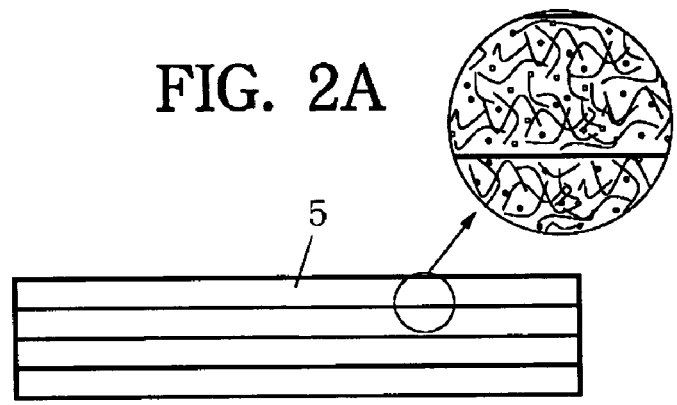
FIG. 2A is a schematic illustration of a plurality of stacked fiber mats before pressing and heating the same by a production process according to one embodiment of the present invention.
Figure 2B:
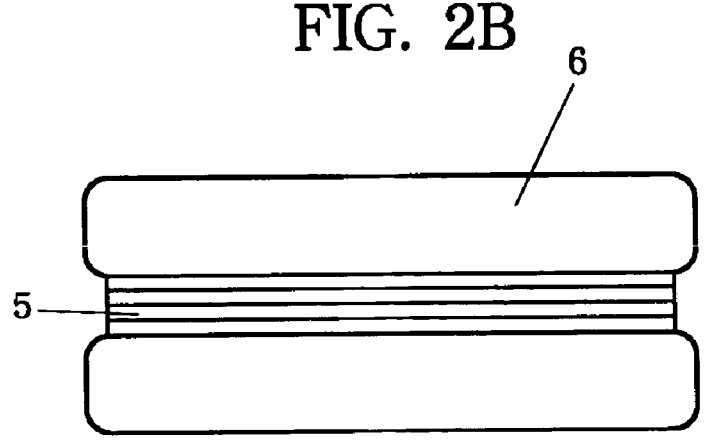
FIG. 2B schematically illustrates the production process according to the one embodiment of the present invention, in which the plurality of stacked fiber mats shown in FIG. 2A have been pressed and heated into a core material by a platen-type heating press.
Figure 2C:
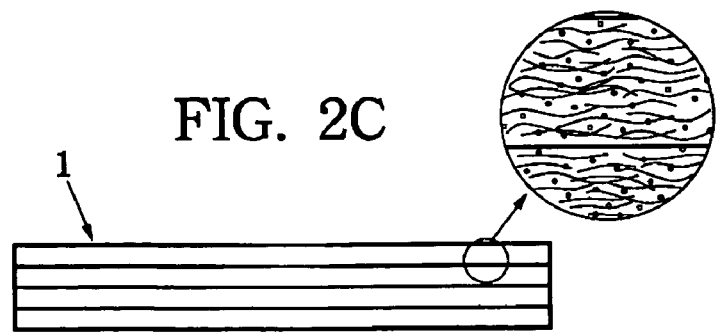
FIG. 2C is a schematic illustration of the core material after it has been released from the platen-type heating press subsequent to its production in FIG. 2B.

A production process according to one embodiment of the present invention will be described with reference to FIGS. 2A to 2C. FIG. 2A illustrates a plurality of fiber mats 5 in a form stacked one over another before pressing and heating, and as shown in an enlarged view of an encircled portion in FIG. 2A, fibers are not oriented substantially in any particular direction like the fibers in the conventionally-known vacuum insulation material. FIG. 2B shows laminated fiber mats in a compressed state as a result of pressing and heating of the stacked fiber mats of FIG. 2A by a platen-type heating press 6. FIG. 2C depicts compressed mats obtained by releasing the laminated fiber mats from the press, that is, a core material 1 so formed. The core material 1 (shown in FIG. 2C) according to the present invention can be obtained, for example, by the process illustrated in FIGS. 2A and 2B. Described specifically, inorganic fibers such as glass wool or rock wool (the description will hereinafter be made by taking "glass fibers" as a representative example) are caused to continuously accumulate on a belt conveyor by melt spinning. While continuously applying an uncured, thermosetting organic binder to the accumulation, the accumulation is formed into a sheet as a glass fiber web while taking up the web in the form of a roll. From the thus-rolled web (incidentally, it is to be noted that in the claims of the present case, the term, namely the above "mat" is used as a term generic to the term, namely the "web".), a plurality of glass fiber mats 5 are cut out and are stacked one over another (FIG. 2A). The stacked mats are formed under heat into a laminate, for example, by the platen-type heating press 6 while pressing them for 30 seconds or longer such that a density of the mats increases to 150 to 400 kg/m$^3$ (FIG. 2B). The laminate is then released from the platen-type heating press 6 to obtain the compressed mats as the core material 1 (FIG. 2C). Incidentally, the density of the mats after pressing but before their release from the platen-type heating press 6 can be determined by a pressure exerted between the upper and lower platens of the press 6.

The glass fiber mats 5 before being subjected to the heating and pressing, said glass fiber mats 5 making up the core material 1, are known by themselves, and each has been obtained by forming glass fibers into a mat-shaped preform with a suitable, uncured, thermosetting organic binder. As such glass fiber mats, a variety of glass fiber mats with diverse densities are known. In the present invention, however, it is preferred that the glass fibers have an average diameter of from 3 to 5 μm and that, before heating and pressing, the glass fiber mat or mats have a density of 3 kg/m$^3$ or higher and a thickness of 10 to 350 mm per mat.

If the average diameter of the glass fibers exceeds 5 μm, the advantageous effects of the present invention cannot be fully brought about in that the resulting vacuum insulation material is provided with reduced thermal performance. As to glass fibers of an average diameter smaller than 3 μm, on the other hand, their production itself is difficult. A glass fiber mat having a density lower than 3 kg/m$^3$ before its heat treatment under pressure is inferior in handling properties upon heating and pressing it, and therefore, is not preferred. Further, a glass fiber mat smaller than 10 mm in the thickness before being subjected to its heat treatment under pressure is not preferred in that its productivity is inferior; and many mats are required. A thickness greater than 350 mm, on the other hand, is not preferred in that the glass fiber mat is inferior in handling properties upon pressing it under heat.

The thermosetting organic binder for use in the present invention (hereinafter simply called the "organic binder") can be an organic binder employed in the production of conventionally-known glass fiber mats, and an aqueous solution, or the like, of a phenol resin precursor as a thermosetting resin can be used preferably. Such an organic binder can be used suitably in such an amount that the amount of solids in the organic binder accounts for 0.5 to 3.0 wt. % of the total amount of the glass fibers, said total amount including the amount of the solids in the organic binder, with a range of from 0.5 to 1.5 wt. % being most preferred. Use of such an organic binder in an amount smaller than 0.5 wt. % is not preferred in that the resulting glass fiber mat is inferior in handling properties because a core material produced from the mat cannot be easily filled in an envelope for its bulkiness and flexibility. Use of the organic binder in an amount greater than 3.0 wt. %, on the other hand, is not preferred either because the resulting vacuum insulation material is provided with inferior heat-insulating performance.

In the present invention, glass fiber mats with the organic binder contained therein are treated under pressure and heat either singly or in stacked combination, although it is preferred to treat a plurality of such glass fiber mats in a form stacked one over another. The number of glass fiber mats to be stacked at this stage differs depending on the density and thickness of each glass fiber mat and the thickness required for the vacuum insulation material to be obtained finally. Nonetheless, it is preferred to treat 2 to 4 mats, for example, of from 60 to 100 kg/m$^3$ in density and from 10 to 50 mm in thickness under pressure and heat in a form stacked one over another, or to use 2 to 4 mats in a form stacked one over another subsequent to their treatment under pressure and heat. It is important for the present invention that the glass fiber mat or mats are heated and pressed under a specific pressing force in a state that the organic binder still adheres in the uncured form on the glass fiber mat or mats. If the glass fiber mat or mats were pressed subsequent to the curing of the organic binder, on the other hand, a vacuum insulation material with the resultant core material filled therein would not be provided with any sufficient surface smoothness.

The pressing is conducted under such conditions that the density of the mats pressed in the form stacked one over another increases to 150 to 400 kg/m$^3$, preferably 200 to 400 kg/m$^3$. Specifically, the pressing is conducted under 150 to 400 kg/m$^2$, preferably 200 to 400 kg/m$^2$ in terms of the pressure between the upper and lower platens of the platen-type press. A density lower than 150 kg/m$^3$ or an inter-platen pressure lower than 150 kg/m$^2$ cannot provide a vacuum insulation material with sufficient surface smoothness subsequent to the filling of the resulting core material, while a density higher than 400 kg/m$^3$ or an inter-platen pressure higher than 400 kg/m$^2$ requires large equipment for pressing the glass fiber mats, and, moreover, cannot provide a vacuum insulation material, a final product, with sufficient thermal performance, because the glass fibers in the glass fiber mats are broken into powder. Pressing conditions outside the above-described ranges are not preferred accordingly.

The pressing time is 30 seconds or longer and, when the pressing is performed by the above-described press, a range of from 60 to 360 seconds is preferred. The heating temperature is generally at least the curing temperature of the organic binder, and specifically, a range of from 160 to 280° C. is preferred. It is to be noted that this temperature is not the temperature of the platens themselves but is the temperature inside the glass fiber mats. Therefore, the above-described pressing and heating treatment can be conducted by raising the temperature of the platens to an adequate level or by raising the temperature of an atmosphere of the press to an appropriate level.

The glass fiber mats subjected to the treatment under pressure and heat as described above become bulkier when released from the pressure subsequent to the pressing and heating treatment (FIG. 2B → FIG. 2C). No particular limitation is imposed on the density and thickness of the core material in this state, although a density of from 45 to 100 kg/m$^3$ and a thickness of from 10 to 70 mm are preferred in general. By such pressing and heating treatment, the glass fibers which make up the core material are caused to extend substantially horizontally relative to the direction of the plane of the core material as shown in an enlarged view of an encircled portion in FIG. 2C, so that the core material is provided with improved surface smoothness, and, owing to the thermal curing of the organic binder, the above-described state is maintained. As a result, use of the thus-pressed and heated core material as a core material for a vacuum insulation material makes it possible to obtain the vacuum insulation material with excellent heat-insulating properties, surface smoothness and working efficiency.

Figure 3:
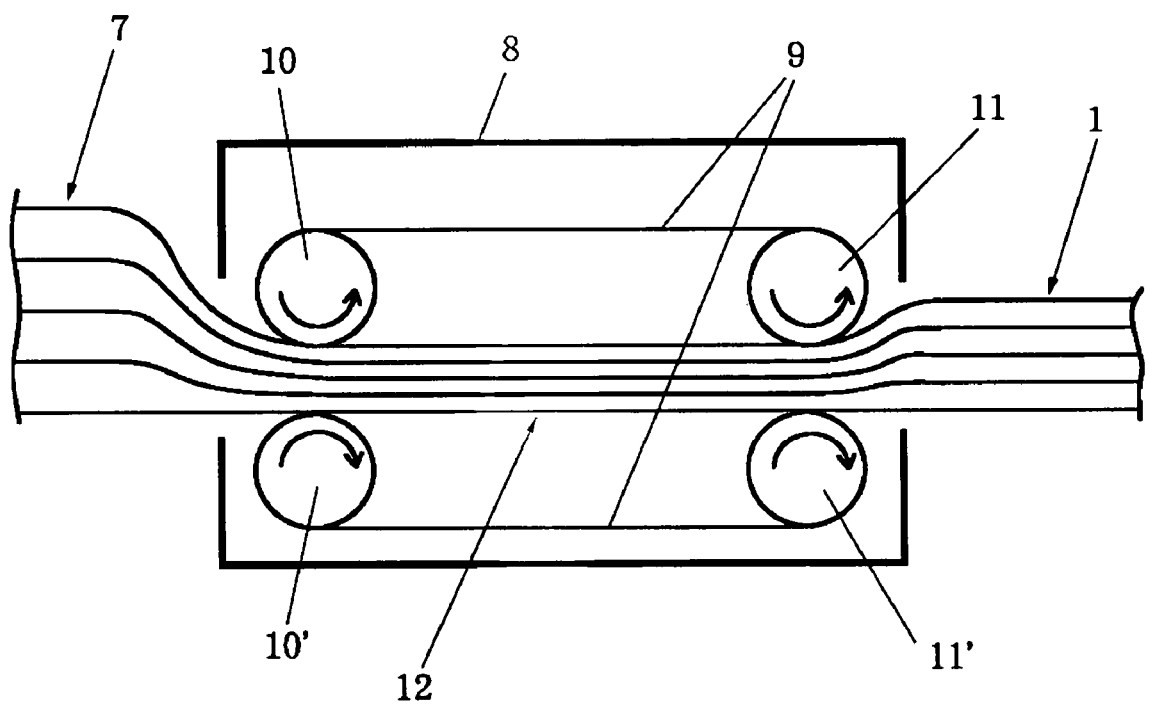
FIG. 3 schematically illustrates a production process according to another embodiment of the present invention.

The production process of the present invention as described above with reference to FIGS. 2A to 2C is a preferred embodiment of the present invention, and a production process according to another preferred embodiment of the present invention will be described with reference to FIG. 3. FIG. 3 illustrates stacked fiber webs 7 before being subjected to pressing and heating, a heating oven 8, a heated pressing conveyor 9, a pair of upstream rolls 10, 10', a pair of downstream rolls 11, 11', stacked fiber webs 12 under pressing and heating, and a laminated web (in other words, a core material) 1 produced by the pressing and heating.

According to the production process of this embodiment as illustrated in FIG. 3, four glass fiber web production are used. Glass fibers which are continuously formed by melt spinning in each production line are caused to continuously accumulate at a predetermined density on an unillustrated transporting means such as a belt conveyor. An uncured organic binder is continuously applied to the accumulation of glass fibers such that the glass fibers are formed into a web. Without taking up in the form of rolls the four webs of glass fibers formed as described above (needless to say, such webs may be taken up into rolls and may then be continuously paid out from the rolls), the four webs of a predetermined length are stacked one over another into stacked fiber webs 7. By the paired upstream rolls 10, 10' and the paired downstream rolls 11, 11' which constitute the heated pressing conveyor 9 driven within the heating oven 8, the stacked fiber webs 7 are then continuously pressed while the organic binder is thermally cured. This embodiment is preferred because the use of the conveyor 9 can continuously produce the desired core material 1 while continuously pressing and heating the stacked fiber webs 12 for a predetermined time. The length of the conveyor 9 may preferably be from 10 to 30 m although it varies depending on the line speed. A conveyor length shorter than 10 m results in insufficient pressing and heating, thereby making it difficult to obtain such a core material as permitting the provision of a smooth vacuum insulation material. A conveyor length longer than 30 m, on the other hand, requires large equipment, and therefore, is not preferred. When the pressing is continuously conducted by the conveyor, the pressing time is 30 seconds or longer with 60 to 180 seconds being preferred. A pressing time shorter than 30 seconds leads to insufficient pressing and heating, thereby failing to obtain such a core material as permitting the provision of a smooth vacuum insulation material. A pressing time longer than 180 seconds, on the other hand, results in inferior production efficiency, or is unable to provide a vacuum insulation material having smoothness better than expectation—it only needs large equipment, and therefore, is not preferred. Various preferred conditions (such as heating and pressing conditions and time) for this embodiment are similar to those for the production process described above with reference to FIGS. 2A to 2C.

To produce a vacuum insulation material by using a core material obtained in accordance with the present invention as described above, the vacuum insulation material can be obtained, for example, by covering the core material with a gas barrier envelope and then evacuating the envelope. Preferred usable examples of the material of the envelope include resin films such as polyester films, polyethylene films, polyvinyl chloride films, polyvinylidene chloride films, polystyrene films and polypropylene films; laminates of the above-described films with craft paper sheets; laminates of the above-described films with aluminum foils; and the above-described films with aluminum accumulated thereon.

The production itself of the vacuum insulation material can be conducted by a known process. For example, a mold is provided, which is formed of a top force and a bottom force and is equipped with an evacuation port formed through one of the top and bottom forces to conduct evacuation by a vacuum pump. On an inner wall of a cavity defined by the upper and lower forces of the mold, an upper gas-barrier film 2-1 having an evacuation tube 3 and a peripheral seal portion 4-1 and a lower gas-barrier film 2-2 having a peripheral seal portion 4-2, for example, aluminum-accumulated high-density polyethylene films are arranged. After a core material 1 according to the present invention is disposed between the upper and lower films 2-1, 2-2, the mold is closed. The upper and lower films 2-1, 2-2 are fusion bonded at their peripheral seal portions 4-1, 4-2 to form a gas barrier envelope 2, which is then evacuated through the evacuation tube 3 to lower its internal pressure to 10.0 Pa or less. Subsequently, the evacuation tube 3 is sealed up and the resultant molding is taken out of the mold to obtain a vacuum insulation material according to the present invention. The vacuum insulation material can be obtained with its size, thickness and the like altered as desired depending on its use.

As the core material according to the present invention has been compression formed to a density in the specific range, good working efficiency can be achieved upon covering the core material with the envelope for the production of the vacuum insulation material. Further, the use of the core material obtained in accordance with the present invention can provide the resulting vacuum insulation material with pronouncedly improved heat-insulating properties, because the glass fibers which constitute the core material are aligned with the direction of the plane of the core material. For the same reason, the surfaces of the vacuum insulation material are smooth so that, when the heat insulation material is used, substantially no spacings are left between the heat insulation material and the associated wall or walls of a casing in which the vacuum insulation material is inserted, thereby also providing marked improvements in heat insulating properties.

EXAMPLES

The present invention will next be described in further detail based on Examples and Comparative Examples.

Example 1

Onto glass fibers having an average fiber diameter of 4 µm, a phenol resin binder was sprayed in such an amount that the ignition loss (the solid content of the resin binder based on the total amount of the glass fibers) would reach 1 wt. %, and a glass fiber mat was taken up in the form of a roll with the binder still remaining in an uncured state (thickness: about 30 mm, density: about 27 kg/m$^3$). The glass fiber mat was stacked in four plies, and by a platen-type press, the stacked glass fiber mats were heated and pressed at 200° C. for 5 minutes such that their overall thickness and density reached 10 mm and about 320 kg/m$^3$, respectively, in the compressed form. As a result, the binder was cured to obtain a core material for a vacuum insulation material, which had a thickness of about 60 mm and a density of about 53 kg/m$^3$. The core material was inserted in an envelope of high gas barrier properties. By a vacuum sealing machine, the envelope was evacuated through an evacuation port until the pressure inside the envelope was lowered to 1.0 Pa, and the evacuation port of the envelope was then compression bonded under heat to obtain a vacuum insulation material of 12 mm in thickness and 250 kg/m$^3$ in density.

Example 2

Onto glass fibers having an average fiber diameter of 4 µm, a phenol resin binder was sprayed in such an amount that the ignition loss would reach 1 wt. %, and through a hot-air circulation oven, a glass fiber web (thickness: about 300 mm, density: about 3 kg/m$^3$) was heated and pressed at 260° C. for an oven residence time of about 90 seconds while holding the web between upper and lower conveyors such that its density increased to about 250 kg/m$^3$ in the compressed form. As a result, a core material for a vacuum insulation material was obtained with a thickness of about 20 mm and a density of about 50 kg/m$^3$. Using the core material, a vacuum insulation material was obtained in a similar manner as in Example 1.

Comparative Example 1

Onto glass fibers having an average fiber diameter of 4 µm, a phenol resin binder was sprayed in such an amount that the ignition loss would reach 1 wt. %, and a glass fiber mat was taken up in the form of a roll with the binder still remaining in an uncured state (thickness: about 30 mm, density: about 27 kg/m$^3$). The glass fiber mat was stacked in four plies, and by a platen-type press, the stacked glass fiber mats were heated and pressed at 200° C. for 5 minutes such that their overall thickness and density reached 20 mm and about 120 kg/m$^3$, respectively, in the compressed form. As a result, the binder was cured to obtain a core material for a vacuum insulation material, which had a thickness of about 80 mm and a density of about 40 kg/m$^3$. Using the core material, a vacuum insulation material was obtained in a similar manner as in Example 1.

Comparative Example 2

Onto glass fibers having an average fiber diameter of 4 µm, a phenol resin binder was sprayed in such an amount that the ignition loss would reach 1 wt. %, and a glass fiber mat was taken up in the form of a roll with the binder still remaining in an uncured state (thickness: about 30 mm, density: about 27 kg/m$^3$). The glass fiber mat was stacked in four plies, and by a platen-type press, the stacked glass fiber mats were heated and pressed at 200° C. for 5 minutes such that their overall thickness and density reached 30 mm and about 80 kg/m$^3$, respectively, in the compressed form. As a result, the binder was cured to obtain a core material for a vacuum insulation material, which had a thickness of about 90 mm and a density of about 35 kg/m$^3$. Using the core material, a vacuum insulation material was obtained in a similar manner as in Example 1.

Ranking

By the below-described ranking methods, the vacuum insulation materials of the above-described Examples and Comparative Examples were ranked in surface smoothness, thermal conductivity, working efficiency and product cost. The results are presented in Table 1.

Ranking Methods

1. Surface Smoothness
A: Substantially not rugged, with concavity depths smaller than 1 mm.
B: Slightly rugged, with concavity depths of 1 mm and greater but smaller than 2 mm.
C: Significantly rugged, with concavity depths of 2 mm and greater.

2. Thermal Conductivity

Measured by a thermal conductivity tester (model: HC-074-1000) manufactured by EKO INSTRUMENTS CO., LTD.

3. Working Efficiency

Time Required for Inserting a Core Material in an Envelope (Core Material Width: 500 mm, Core Material length: 1,500 mm)

A: Less than 1 min.
B: 1 min. or more but less than 2 min.
C: 2 min. or more but less than 5 min.
D: 5 min. or more.

4. Product Cost
A: Low
B: High

TABLE 1

|  | Ex. 1 | Ex. 2 | Comp. Ex. 1 | Comp. Ex. 2 |
| --- | --- | --- | --- | --- |
| Surface smoothness | A | B | C | C |
| Thermal conductivity (W/mK) | 0.0021 | 0.0020 | 0.0022 | 0.0022 |
| Working efficiency | A | B | C | D |
| Product cost | B | A | B | B |

This application claims the priority of Japanese Patent Application 2003-202426 filed Jul. 28, 2003 and also the priority of Japanese Patent Application 2004-154554 filed May 25, 2004, both of which are incorporated herein by reference.

The invention claimed is:

1. A production process of a core material for a vacuum insulation material having substantially horizontally extending fibers relative to the direction of the plane of said core material, wherein the production process comprises forming under heat a mat of inorganic fibers with an uncured, thermosetting organic binder adhered thereon into said core material while pressing said mat for a period of at least 30 seconds such that a density of said mat increases to 150 kg/m$^3$ to 400 kg/m$^3$ during said forming of said core material, whereby said pressing and heating causes said inorganic fibers to extend substantially horizontally relative to the direction of the plane of said core material, wherein said mat of inorganic fibers has a density of from about 3 kg/m$^3$ to about 27 kg/m$^3$ prior to said forming of said core material under heat and pressure, wherein said core material after said forming under heat and pressure has a density of from 45 kg/m$^3$ to 100 kg/m$^3$, wherein an amount of solids in said uncured, thermosetting organic binder which is contained in said mat accounts for 0.5 wt. % to 1.5 wt. % of a total amount of said mat, said total amount including said amount of said solids in said thermosetting organic binder.

2. The production process according to claim 1, wherein said mat is pressed for a period of from 60 seconds to 180 seconds.

3. The production process according to claim 1, wherein subsequent to an application of said uncured, thermosetting organic binder to inorganic fibers, said inorganic fibers are collected into a mat-shaped body, and said mat-shaped body is then formed into said core material under heat and pressure.

4. The production process according to claim 1, wherein said inorganic fibers have an average diameter of from 3 µm to 5 µm, and before said forming under heat and pressure, said mat of inorganic fibers has a thickness of from 10 mm to 350 mm.

5. The production process according to claim 1, wherein said forming is conducted under pressure and heat such that the resulting core material has a thickness of from 10 mm to 70 mm.

6. The production process according to claim 1, wherein a plurality of stacked mats of inorganic fibers with an uncured, thermosetting organic binder adhered thereon are formed into a core material under heat while said plurality of stacked mats are pressed for at least 30 seconds such that a density of said stacked mats increases to 150 kg/m$^3$ to 400 kg/m$^3$.

7. The production process according to claim 1, wherein the inorganic fibers are glass fibers.

8. The production process according to claim 1, wherein the organic binder is a phenol resin.

9. The production process according to claim 6, wherein the density of said stacked mats increases to 200 kg/m$^3$ to 400 kg/m$^3$.

10. The production process according to claim 1, wherein the heating temperature is at least the curing temperature of the organic binder.

11. The production process according to claim 1, wherein said mat is pressed at a pressure of from 150 kg/m$^2$ to 400 kg/m$^2$ during said forming of said core material.

12. The production process according to claim 11, wherein said mat is pressed at a pressure of from 200 kg/m$^2$ to 400 kg/m$^2$ during said forming of said core material.

* * * * *